United States Patent
Asawa et al.

(10) Patent No.: US 12,498,987 B2
(45) Date of Patent: Dec. 16, 2025

(54) CLOUD-BASED ORCHESTRATION OF NETWORK FUNCTIONS

(71) Applicant: Amazon Technologies, Inc., Seattle, WA (US)

(72) Inventors: Manjari Asawa, Cupertino, CA (US); Robin Satish Harwani, Frisco, TX (US)

(73) Assignee: Amazon Technologies, Inc., Seattle, WA (US)

( * ) Notice: Subject to any disclaimer, the term of this patent is extended or adjusted under 35 U.S.C. 154(b) by 813 days.

(21) Appl. No.: 17/710,571

(22) Filed: Mar. 31, 2022

(65) Prior Publication Data
US 2023/0315534 A1    Oct. 5, 2023

(51) Int. Cl.
G06F 9/50    (2006.01)
G06F 9/455   (2018.01)
G06F 11/34   (2006.01)
H04W 48/18   (2009.01)

(52) U.S. Cl.
CPC ........ *G06F 9/5072* (2013.01); *G06F 9/45558* (2013.01); *G06F 9/5077* (2013.01); *G06F 11/3409* (2013.01); *H04W 48/18* (2013.01); G06F 2009/45591 (2013.01); G06F 2009/45595 (2013.01)

(58) Field of Classification Search
CPC ..... H04W 48/18; H04W 88/02; G06F 9/5027; G06F 9/50; G06F 9/5072; G06F 9/45558; G06F 9/5077; G06F 11/3409; G06F 2009/45591; G06F 2009/45595; G06F 2209/501; G06F 2209/502
See application file for complete search history.

(56) References Cited

U.S. PATENT DOCUMENTS

| | | |
|---|---|---|
| 8,539,079 B2 | 9/2013 | Thireault |
| 9,125,047 B2 | 9/2015 | Sundaresan et al. |
| 9,703,660 B2 | 7/2017 | Cillis et al. |
| 9,838,268 B1 | 12/2017 | Mattson |
| 9,876,851 B2 | 1/2018 | Chandramouli et al. |
| 10,064,242 B2 | 8/2018 | Pawar et al. |
| 10,135,702 B2 | 11/2018 | Lahiri |
| 10,244,507 B2 | 3/2019 | Tarlazzi et al. |
| 10,257,105 B2 | 4/2019 | Majmundar et al. |
| 10,419,550 B2 | 9/2019 | Nainar et al. |
| 10,581,717 B2 | 3/2020 | Tejaprakash et al. |

(Continued)

FOREIGN PATENT DOCUMENTS

WO    2014073949 A1    5/2014

OTHER PUBLICATIONS

U.S. Appl. No. 18/630,891, filed Apr. 9, 2024, Shevade, et al.

(Continued)

*Primary Examiner* — Kenneth Tang
(74) *Attorney, Agent, or Firm* — Robert C. Kowert; Kowert, Hood, Munyon, Rankin & Goetzel, P.C.

(57) ABSTRACT

A request to deploy an application is received at a network function management service of a cloud computing environment. Based on an expected geographical distribution of the application, a premise is selected from a set of premises at which computing resource are managed from the cloud computing environment. A virtualized network function of the application is executed at a resource located at the premise.

20 Claims, 8 Drawing Sheets

(56) References Cited

U.S. PATENT DOCUMENTS

| | | |
|---|---|---|
| 10,594,456 B2 | 3/2020 | Park et al. |
| 10,608,734 B2 | 3/2020 | Barbieri et al. |
| 10,705,808 B2 | 7/2020 | Chiosi et al. |
| 10,749,721 B2 | 8/2020 | Fertonani et al. |
| 10,750,514 B2 | 8/2020 | Fujinami |
| 10,817,409 B2 | 10/2020 | Zeng et al. |
| 10,880,173 B2 | 12/2020 | Seenappa et al. |
| 10,891,140 B1 | 1/2021 | Levin |
| 10,944,668 B2 | 3/2021 | Rajagopal |
| 10,959,098 B2 | 3/2021 | Cidon et al. |
| 10,999,783 B2 | 5/2021 | Pateromichelakis |
| 11,190,413 B1 | 11/2021 | Priya et al. |
| 11,356,500 B1 | 6/2022 | Gupta et al. |
| 11,539,582 B1 | 12/2022 | Gupta et al. |
| 11,552,842 B2 | 1/2023 | Barabell |
| 11,720,425 B1 | 8/2023 | Yang |
| 11,743,117 B2 | 8/2023 | Gupta |
| 11,800,404 B1 | 10/2023 | Yang |
| 11,824,943 B1 | 11/2023 | Krasilnikov et al. |
| 11,916,999 B1 | 2/2024 | Gupta |
| 11,937,103 B1 | 3/2024 | Krasilnikov |
| 11,985,065 B2 | 5/2024 | Shevade et al. |
| 2012/0127151 A1 | 5/2012 | Murakami |
| 2018/0146375 A1 | 5/2018 | Pawar et al. |
| 2018/0365635 A1 | 12/2018 | Lucrecio et al. |
| 2019/0042326 A1 | 2/2019 | Chilikin |
| 2019/0045037 A1* | 2/2019 | Sukhomlinov ....... G06F 9/5077 |
| 2019/0158606 A1 | 5/2019 | Guim Bernat et al. |
| 2019/0165906 A1 | 5/2019 | Bala et al. |
| 2019/0190785 A1 | 6/2019 | Power |
| 2019/0213029 A1 | 7/2019 | Liu et al. |
| 2019/0230046 A1* | 7/2019 | Djukic .................... H04L 47/76 |
| 2019/0289497 A1 | 9/2019 | Rajagopal |
| 2019/0294446 A1* | 9/2019 | Liguori .................... G06F 8/65 |
| 2019/0391855 A1 | 12/2019 | Bernat et al. |
| 2019/0394826 A1 | 12/2019 | Wang et al. |
| 2020/0245229 A1 | 7/2020 | Horn et al. |
| 2021/0006944 A1 | 1/2021 | Raghothaman et al. |
| 2021/0073047 A1 | 3/2021 | Bhandaru |
| 2021/0144517 A1* | 5/2021 | Guim Bernat ........ H04L 9/3247 |
| 2021/0144555 A1 | 5/2021 | Kim et al. |
| 2021/0152449 A1* | 5/2021 | Wang ................. H04L 43/0852 |
| 2021/0243770 A1 | 8/2021 | Roessler |
| 2021/0258866 A1* | 8/2021 | Chou .................... H04W 48/16 |
| 2021/0271517 A1 | 9/2021 | Guim Bernat |
| 2021/0279161 A1 | 9/2021 | Tameshige |
| 2022/0019667 A1* | 1/2022 | Sood ...................... G06F 9/505 |
| 2022/0030117 A1 | 1/2022 | Young et al. |
| 2022/0046084 A1 | 2/2022 | Nair |
| 2022/0070734 A1 | 3/2022 | Rajagopal |
| 2022/0377615 A1 | 11/2022 | Radunovic |
| 2023/0325266 A1 | 10/2023 | Yang |
| 2023/0409362 A1 | 12/2023 | Shevade |
| 2023/0409363 A1 | 12/2023 | Shevade |
| 2024/0040002 A1 | 2/2024 | Krasilnikov et al. |
| 2024/0196178 A1* | 6/2024 | Ying ........................ H04W 8/18 |
| 2024/0202153 A1 | 6/2024 | Huang |
| 2024/0202157 A1 | 6/2024 | Paterra |
| 2024/0205680 A1 | 6/2024 | Paterra |
| 2024/0236178 A1 | 7/2024 | Gupta et al. |

OTHER PUBLICATIONS

Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.

Unknown, "5G; NG-RAN; Architecture Description", Technical Specification, ETSI TS 138 401, Version 16.8.0, Release 16, Jan. 2022, pp. 1-82.

U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/808,518, filed Jun. 23, 2022, Ozgur Dural.
U.S. Appl. No. 17/820,542, filed Aug. 17, 2022, Nikolay Kirschenmann, et al.
U.S. Appl. No. 17/810,319, filed Jun. 30, 2022, Julius Mueller, at al.
U.S. Appl. No. 17/809,864, filed Jun. 29, 2022, Nikolay Kirschenmann, et al.
U.S. Appl. No. 18/146,126, filed Dec. 23, 2022, Diwakar Gupta.
U.S. Appl. No. 18/067,651, filed Dec. 16, 2022, Frank Paterra.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
U.S. Appl. No. 17/326,218, filed May 20, 2021, Ximeng Simon Yang, et al.
U.S. Appl. No. 17/364,779, filed Jun. 30, 2021 Diwakar Gupta et al.
U.S. Appl. No. 17/364,788, filed Jun. 30, 2021, Diwakar Gupta et al.
U.S. Appl. No. 17/364,789, filed Jun. 30, 2021, Diwakar Gupta et al.
U.S. Appl. No. 17/364,791, filed Jun. 30, 2021, Diwakar Gupta et al.
U.S. Appl. No. 17/326,221, filed May 20, 2021, Ximeng Simon Yang, et al.
U.S. Appl. No. 17/461,785, filed Aug. 30, 2021, Diwakar Gupta et al.
U.S. Appl. No. 17/548,391, filed Dec. 10, 2021, Ammar Latif et al.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.

International Search Report and Written Opinion mailed May 4, 2023 in PCT/US2023/064505, Amazon Technologies, Inc., pp. 1-11.

Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

\* cited by examiner

CLOUD-BASED ORCHESTRATION OF NETWORK FUNCTIONS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. As 5G technology becomes more prevalent, new types of broadband-based applications are likely to be developed and deployed, with some parts of the technology stack being executed using resources at cloud computing environments.

Figure 1:
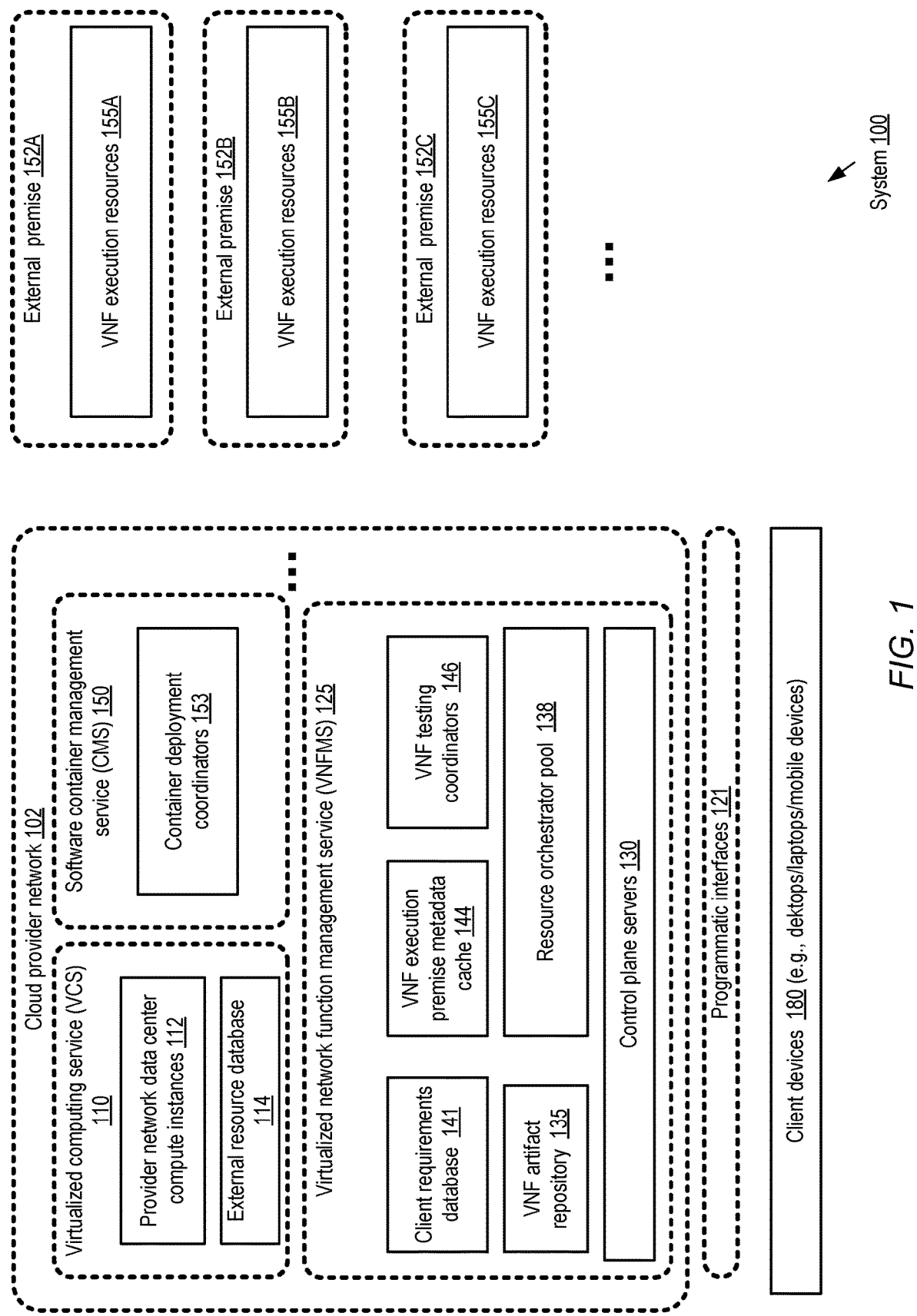
FIG. 1 illustrates an example system environment in which resource orchestrators of a virtualized network function management service of a cloud provider network may select resources for executing telecommunication applications and other latency sensitive applications at a variety of geographically distributed premises, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for the selection and configuration, by a cloud-based service, of resources at geographically distributed premises (including premises external to the data centers of the cloud provider network at which the service runs) selected by the cloud-based service for executing network functions of telecommunications applications and other latency-sensitive services. A network function is a functional building block within a network infrastructure, which has well-defined external interfaces and a well-defined functional behavior. Network functions can be chained together to form pipelines for executing telecommunications services or applications, such as public or private 5G data or voice applications, IoT (Internet of Things) applications, and the like. Network functions have historically been implemented as a physical network appliance or node; however, network functions can be virtualized as well. For many telecommunication applications (such as applications using fifth-generation or 5G broadband cellular technology) implemented largely or wholly without using cloud provider network-managed resources, software components referred to as "service orchestrators" have traditionally been responsible for making placement decisions regarding network functions. As such, the service orchestrators have to be provided detailed information about the resources that can be used for the network functions, such as their geographic locations, network addresses, performance capacities and so on. In some cases, overlapping repositories of resource information are maintained at other components referred to as "network function virtualization orchestrators" (NFVOs) responsible for executing the network functions, leading to potential consistency problems when making placement decisions. Proposed functional and interface requirements of service orchestrators and NFVOs are defined, for example, by organizations such as ETSI (the European Telecommunications Standards Institutes) in specification documents.

If an organization responsible for developing and deploying a telecommunication application makes a decision to implement part (or all) of the functionality of the application with the help of a cloud provider network, a virtualized network function management service (VNFMS) can be employed for automating and simplifying many resource-related decisions. A VNFMS of a worldwide cloud provider network can utilize existing decades-long expertise (e.g., accumulated over the years at a virtualized computing service (VCS) of the cloud provider network) in efficiently managing computing resources to simplify the process of selecting and configuring resources for virtualized network functions (VNFs) (network functions that are not necessarily tied to specific hardware devices) of telecommunication applications and other similar applications. A VCS can be used to run virtual machines or compute instances at a variety of geographical locations, including data centers of the cloud provider network, edge locations or extensions of the cloud provider network to various types of premises external to the data centers, including premises owned/managed by clients or third-parties, and so on.

Instead of choosing resources for executing VNFs by itself, a service orchestrator of a telecommunication application can simply specify logical requirements of the application to the VNFMS via programmatic interfaces and request the VNFMS to identify and manage an appropriate set of resources. The requirements can include an indication of the VNFs to be executed, performance requirements such as latencies required for individual VNFs or for combinations of VNFs, the expected request rates and geographical distribution of workloads of the applications and so on. Resource orchestrators of the VNFMS can generate and implement placement plans for the application, without requiring the service orchestrators to specify the resources at which the VNFs are to be run. The information about the expected geographic distribution can, for example, be used to select premises at which compute instances or other candidate resources for executing software containers implementing the VNFs of the applications can be run. At a selected premise, the VNFMS resource orchestrators can identify existing resources and/or configure new resources based on performance requirements of the application, and then initiate the execution of VNFs at such resources. The set of resources employed for a given application at a given premise can be scaled up or down automatically by the VNFMS (e.g., with the help of auto-scaling tools of a VCS) as needed to satisfy the performance requirements which minimizing costs for the application owner. In some cases, the application owner may be aware of anticipated time-varying fluctuations in application demand—e.g., during pre-holiday periods or during special sales periods, the workload for the application may be expected to rise. Information about such exceptions in the workload can be provided to the VNFMS, and the number of compute instances or other resources set up for the application can be proactively adjusted as needed.

As one skilled in the art will appreciate in light of this disclosure, certain embodiments may be capable of achieving various advantages, including some or all of the following: (a) providing desired levels of performance (such as application request response times) for telecommunications applications and other latency sensitive applications with geographically distributed workloads, without requiring the owners of the applications to manage resources for executing the applications and/or (b) reducing the total amount of computing and other resources that are required for such applications, e.g., by automatically reducing the resources allocated when appropriate, and/or by utilizing some of the resources in multi-tenant mode.

According to some embodiments, a system may comprise one or more resource orchestrators of a network function management service of a cloud provider network, each resource orchestrator being implemented using a combination of software and hardware at one or more computing devices. The system may also include a set of candidate resources for execution of software containers which can be used to implement VNFs. The candidate resources may include, for example, physical and/or virtualized servers in various embodiments, with respective subsets of the candidate resources located at respective premises at differing geographical locations. One or more of the premises may be external to the data centers of the provider network. A given resource orchestrator may obtain a deployment request for a telecommunication application via one or more programmatic interfaces from a service orchestrator associated with the application. The deployment request may, for example, indicate a pipeline of VNFs of the telecommunication application, a performance requirement of the telecommunication application, and an expected geographical distribution of a workload of the telecommunication application. In various embodiments the deployment request may not identify a resource to be used for the telecommunication application. The performance requirement may, for example, latency targets for various VNFs or combinations of VNFs, request rates for the VNFs, network bandwidth requirements for communications between VNFs and/or between VNFs application end users, computation requirements (such as the speeds of CPUs or other computing elements), targeted end-user request response time ranges, the number of software containers or other similar software execution environments or processes needed for the application, and so on. In some embodiments, the deployment request may specify connectivity requirements (e.g., the topology of the pipeline, showing which VNFs provide input for or obtain output from which other VNFs) for messages between different VNFs.

The resource orchestrator may select, based at least in part on the expected geographical distribution, a premise external to the provider network data center for implementing at least a portion of the pipeline in various embodiments. In some cases, for example depending on the specific kinds of VNFs that make up the pipeline and/or on premise category preferences indicated by the application owner via programmatic interfaces, a combination of premises outside the provider network data centers, as well as some data centers may be selected. The resource orchestrator may identify, based at least in part on the performance requirement, a particular candidate resource at a selected premise for executing a VNF of the application, and cause the VNF to be executed at the identified resource. Connectivity requirements of the VNFs may also be used to identify the candidate resources used for the VNFs in some embodiments. In some cases, the resource orchestrator may be able to identify existing resources (such as VCS compute instances that have already been launched) for the VNFs at a particular premise. In other cases, the resource orchestrator may configure new resources, e.g., by setting up isolated virtual networks (IVNs) such as virtual private clouds, defining subnets, and then requesting the launch of new compute instances within such a subnet. For many of the operations it performs, a resource orchestrator may utilize programmatic interfaces supported by a VCS in some embodiments.

Telecommunication applications may represent just one example of latency-sensitive applications for which resource selection and configuration is performed at a VNFMS. A latency-sensitive application can be defined as an application whose end users are very sensitive to delays in responses to their requests. Other examples of latency-sensitive applications can include voice-driven applications involving verbal interactions with virtual assistants, IoT applications, virtual reality applications, augmented reality applications, and the like. In some embodiments the VNFMS may be used for time-sensitive analytics applications (e.g., applications in which incoming data has to be analyzed within very short time periods) and/or for multi-player games (in which rapid responsiveness of the gaming software to actions taken by various players is important). In at least one embodiment, the VNFMS may be used for resource selection and configuration for some network function based applications that may not necessarily have very strict latency requirements.

In one embodiment, in response to receiving a deployment request, a resource orchestrator of a VNFMS may determine that a requirement indicated in the request cannot be satisfied, or cannot be satisfied easily within a budget limit indicated in the deployment request. In response to such a determination the VNFMS may propose an alteration to one or more request parameters, in a recommendation message sent to the service orchestrator. The VNFMS may, for example, suggest a loosening of a performance requirement and/or a change to the budget. If desired, the application owner may submit a modified version of the deployment request, in which one or more requirements have been changed based on the recommendation. The VNFMS may then verify that the modified deployment request can be satisfied, and select the resources for the application if the verification succeeds.

According to some embodiments, a deployment request directed to a VNFMS may include isolation requirements. For example, for some VNFs of an application, the application owner may wish to ensure that only those VNFs are run at a particular compute instance or physical server, without sharing the compute instance or physical server with any other application. In such a scenario, a resource orchestrator may configure a compute instance or physical server in single-tenant mode for exclusive use for one or more such VNFs. In one embodiment, a deployment request may indicate an availability requirement (e.g., a requirement that a downtime of the application be no more than X seconds or minutes per year), in which case the resource orchestrator may configure redundant sets of resources for VNFs, enabling VNFs to be migrated from one resource to another to provide the desired level of availability.

A VNFMS may implement various actions to ensure visibility into the health state and performance state of various VNFs of an application in some embodiments. These actions may include, for example, establishing monitoring agents at the resources selected for VNFs, implementing easy-to-use consoles or other interfaces to enable application owners to view the state of the running VNFs, and so on. In at least one embodiment, the VNFMS may also help manage the development of new versions of VNFs, e.g., by providing access to testing and debugging resources for the VNF code.

In at least some embodiments, as indicated above, a VNFMS and/or a VCS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, containers of a latency-sensitive application may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VNFMS and the VCS, data processing service(s) (e.g., map reduce, data flow, and/or other large scale data processing techniques), data storage services (e.g., object storage services, block-based storage services, or data warehouse storage services), packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which resource orchestrators of a virtualized network function management service of a cloud provider network may select resources for executing telecommunication applications and other latency sensitive applications at a variety of geographically distributed premises, according to at least some embodiments. As shown, system 100 comprises resources and artifacts of a virtualized network function management service (VNFMS) 125 of a cloud provider network 102, including a resource orchestrator pool 138, a VNF artifact repository, a client requirements database 141, VNF execution premise metadata cache 144, VNF testing coordinators 146 and control plane servers 130. The control plane servers may be responsible for monitoring the health of the other VNFMS components, adding new resource orchestrators to pool 138 as needed, and other administrative tasks.

Cloud provider network 102 may also comprise a number of other services such as a virtualized computing service (VCS) 110, a software container management service (CMS), and the like in the depicted embodiment. The VCS 110 may include provider network data center compute instances 112 (e.g., a fleet of compute instances launched at virtualization servers at provider network data centers) and an external resource database 114 storing information about compute instances managed by the VCS but run at locations external to the data centers of the provider network. The CMS 150 may for example include container deployment coordinators 153 in the depicted embodiment, responsible for such tasks as transferring machine images used for software containers to the servers where the containers are to be launched, initiating execution of the containers, and so on. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines, which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. Some latency-sensitive applications and services may be organized as a collection of tasks, with each task run using a set of containers. The subcomponents of the VNFMS 125, VCS 110 and CMS 150 shown in FIG. 1 may each comprise some combination of software and hardware of one or more computing devices.

The majority of the components of the services of the provider network 102 may be implemented using resources located at a set of data centers of the provider network. However, at least some resources located at premises external to the data centers may also be managed by the provider network services. For example, some VNFs of telecommunication applications and other latency-sensitive applications that are managed from the provider network may have to be implemented at locations closer to the end users of the applications and/or closer to telecommunication equipment such as cell towers. Such VNFs may be run at VNF execution resources 155A, 155B or 155C, located at external premise 152A, 152B and 152C respectively.

The VNFMS may implement a set of programmatic interfaces 121 in the depicted embodiment, such as one or more web-based consoles, command-line tools, graphical user interfaces, sets of application programming interfaces (APIs) and the like. Such interfaces may be utilized by VNFMS clients (which may include programs implementing service orchestrators of the kind mentioned above) to submit messages and requests from a variety of client devices 180, such as desktops, laptops, mobile computing devices and the like, and receive corresponding responses from the VNFMS.

Figure 2:
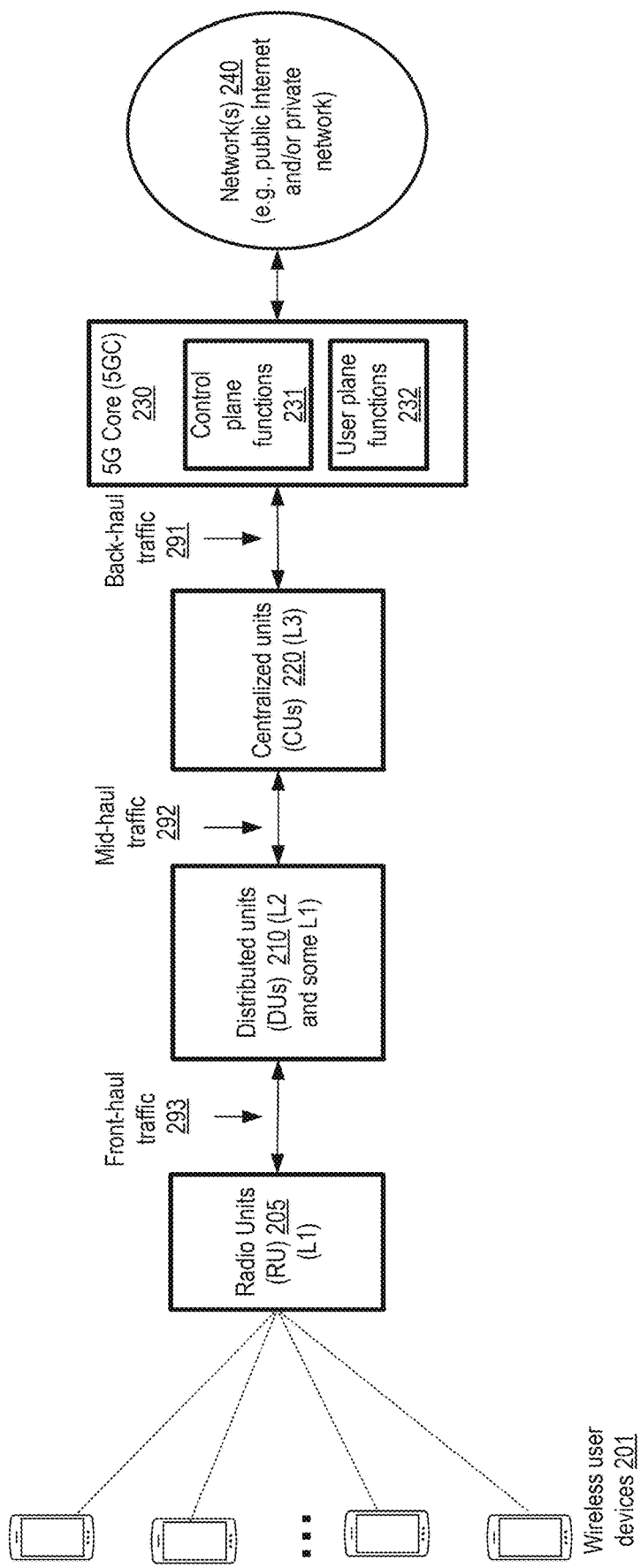
FIG. 2 illustrates components of an example telecommunication application technology stack, a subset of which may be implemented using resources of a provider network, according to at least some embodiments.

VNF developers may generate program code implementing a variety of VNFs, e.g., including VNFs at layers of the kind shown in FIG. 2, and submit the code and associated artifacts (e.g., scripts for launching the VNFs, machine images for software containers comprising the code, etc.) to the VNFMS 125 via programmatic interfaces 121 in some embodiments. The information about available VNFs which can be run using the VNFMS, e.g., including definitions of application pipelines which use several different VNFs, may be stored at VNF artifact repository 135 in the depicted embodiment. The VNFMS may include VNF testing coordinators 146 in some embodiments, which can be employed at the request of a client to perform through tests on new versions of VNFs and/or new versions of application pipelines before deployment.

A deployment request for an application (such as a telecommunication application or some other latency-sensitive application) may be received via programmatic interfaces 121 and examined by a resource orchestrator selected from resource orchestrator pool 138. The deployment request may indicate the pipeline of VNFs of the application, a performance requirement (such as a latency requirement for an individual VNF or a chain of VNFs considered as a group), and an expected geographical distribution of a workload of the application in the depicted embodiment. Other elements may also be included within the deployment request in some embodiments, such as isolation requirements, availability/redundancy requirements and the like. The deployment request may not identify a specific resource to be used for the application in various embodiments.

The resource orchestrator may select, based at least in part on the geographical distribution information regarding the workload, one or more external premises 152 at which a particular VNF of the application should be run. In some embodiments, to select the premise, the resource orchestrator may submit queries to the VCS external resource database 114, which may include inventories or lists of the different external premises at which compute instances of the VCS can be run, and the specific machines and instances running currently at those external premises. The inventories may change over time, as new premises at which VCS extensions can be run are added (or removed), as new servers are added or removed at individual premises, and so on. In at least one embodiment, the VNFMS may cache a subset of the external resource database 114 at a VNF execution premise metadata cache 144, so that much of the information about the external premises that might be useful to the VNFMS is available within the VNFMS itself instead of requiring frequent calls to the VCS to be made. In some embodiments, the VNFMS control plane may subscribe to a service of the VCS which pushes information about changes to the external resource database 114 to the cache 144 automatically. Note that not all the content of the external resource database 114 may be needed by the VNFMS; for example, the external resource database may contain detailed information about thousands of premises worldwide, of which only a subset is useful to the VNFMS. In some embodiments, multiple external premises may potentially be suitable for fulfilling a given application deployment request, and analytics tools such as machine learning models may be used by the VNFMS to select specific premises. In at least some embodiments, some VNFs of the application described in the deployment request may be run at provider network data center compute instances 112, e.g., instead of running all the VNFs at external premises. Provider network data center compute instances may be chosen, for example, if the geographical distribution of the workload indicates that a data center is close enough to a subset of the application's end users that an external premise is not needed. Provider network data center compute instances may also be chosen for specific VNFs (e.g., VNFs at higher layers of a radio-based communication technology stack) whose latency requirements are not very strict.

After a particular premise 152 has been identified for deploying a VNF of an application, the resource orchestrator may attempt to identify individual resources (e.g., already-running compute instances that have available computing capacity) for the VNF. From among several possible candidate VNF execution resources (such as resources 155A, 155B or 155C) that may be available at the selected premise 152, one may be selected for the VNF, e.g., based at least in part on performance requirements indicated in the deployment request for the VNF or for the pipeline as a whole. Performance requirements indicated in the application deployment request may include, among others, (a) a VNF-level latency, (b) a request rate for the virtualized network function, (c) a network bandwidth requirement, (d) a computation (e.g., CPU) requirement, (e) a targeted end-user request response time range, or (f) a number of container processes or virtual machines needed for the application. Information about the current utilization levels of CPUs, memory, networking paths and the like at the external premise may be obtained by the resource orchestrator from the VCS in some embodiments to help select the resource. Using artifacts obtained from the VNF artifact repository, the resource orchestrator may cause a software container comprising code for the VNF to be run at the selected resource in various embodiments. In some embodiments, the container images for the VNFs may be stored at a repository maintained in the CMS 150, and the VNF artifact repository may include identifiers to the containers stored in such a repository. Programmatic interfaces implemented by the CMS, such as a "run_container" or "run_task" interface, may be invoked by the resource orchestrator to launch an instance of the VNF at the selected resource in some embodiments.

In some cases, before launching the VNF, the resource orchestrator may perform some prerequisite configuration operations at the external premise, such as establishing an isolated virtual network (IVN), a subnet, and/or specifying security rules for traffic associated with the VNF. An isolated virtual network may comprise a collection of networked resources (including, for example, compute instances) allocated to a given VCS client or VNFMS client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In some embodiments, in order to ensure that latency-sensitive applications do not interfere with one another, and in order to make use of various VCS networking constructs like virtual network interfaces, VNFs of a given application may be run within an IVN set up for the application by a VNFMS resource orchestrator. In such an embodiment, the resource orchestrator may in effect serve as the VCS client on whose behalf the IVN is established.

In one embodiment, a deployment request may include isolation requirements for the VNFs of the application (e.g., for VNFs that are extremely sensitive to performance), and the resource orchestrator may accordingly designate a compute instance or server at which a container comprising a VNF is to run as a single-tenant compute instance or a single-tenant server. In some embodiments, the deployment request may provide an indication of the connectivity requirements of different VNFs that make up the application, e.g., indicating which VNFs transmit their output to other VNFs, and such connectivity requirements may also be used to select the resources for different VNFs.

In one embodiment, the resource orchestrator may analyze a deployment request in view of the available candidate resources, and determine that the request cannot be fulfilled easily without modifying one or more of the request's parameters. For example, a service orchestrator or application owner may wish to obtain a latency of T milliseconds for a particular VNF, but the resource orchestrator may only be able to find candidate resources that offer 2*T milliseconds latency. In such cases, the resource orchestrator may propose changes to the deployment request, such as changes to the performance requirements and/or changes to a budget the application owner has proposed, and send such proposed modifications as a recommendation message to the deployment request submitter. If the deployment request is modified accordingly, the VNFMS may identify resources matching the modified requirements, and cause the VNFs indicated in the modified deployment request to run at the identified resources in various embodiments.

FIG. 2 illustrates components of an example telecommunication application technology stack, a subset of which may be implemented using resources of a provider network, according to at least some embodiments. The depicted components conform to a 5G-NR (fifth generation-new radio) standard published by 3GPP (Third Generation Partnership Project), a group of organizations responsible for defining protocols for mobile communications; similar layers are also defined for other generations of cellular communication technology. The 5G-NR protocol stack comprises three layers, referred to as L1 (layer 1), L2 (layer 2) and L3 (layer 3), as well as a core layer referred to as 5G Core or 5GC. In the pipeline of tasks of a communication application, L1 is the layer closest to end user equipment such as wireless user devices 201, and 5GC is the layer closest to the Internet or other network being used for transmitting user data and voice. The 5GC layer includes control plane functions 231 and user plane functions 232. Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. In a manner somewhat analogous to the subdivision, discussed above, of provider network functionality into control plane and data plane functionality, the operations needed for telecommunication applications may also be divided into control plane operations and user plane operations. Control plane operations include connection configuration and other administrative tasks such as monitoring, while user plane operations involve transmission of user data using Internet Protocol (IP) packets.

Logic for executing the functionality of the layers L1, L2 and L3 is distributed among three types of components: centralized units (CUs) 220 for L3 operations, distributed units (DUs) 210 used for L2 operations and optionally for some L1 operations, and radio units (RUs) 205 used for at least a subset of L1 operations. Each such unit may comprise its own pipeline of virtualized network functions in some embodiments. For example, respective network functions at the DUs in some embodiments may perform coding, rate matching, scrambling, modulation layer mapping, precoding, function, resource mapping, digital beamforming, Fast Fourier Transforms (FFTs), cyclic prefix insertion, cyclic prefix removal, inverse FFTs, de-mapping, channel estimation, pre-filtering, equalization, demodulation, descrambling, rate de-matching, and/or decoding. Traffic between the RUs and DUs may be referred to as front-haul traffic 293, traffic between the DUs and the CUs may be referred to as mid-haul traffic 292, and traffic between the CUs and the 5GC may be referred to as back-haul traffic 291. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). User plane operations may include quality of service (QoS) Management and Compression Integrity Ciphering in L2, Automatic Repeat Request (ARQ) processing and Hybrid ARQ (HARQ) processing in L2, and Channel Coding at the PHY layer. Control plane operations may include Non-access Stratum (NAS) protocol tasks, System Information (SI) tasks, paging, radio resource control (RRC) and compression integrity ciphering in L3, ARQ and HARQ in L2, and Channel Coding in the PHY layer. Network functions performed at the 5GC layer may for example include functions to aggregate data traffic from end user devices, authenticate subscribers, apply personalized policies, and/or manage the mobility of devices prior to routing traffic to networks 240 such as the Internet or private networks. 5GC may include various types of user plane functions (UPFs) in some embodiments. At least some of the components shown in FIG. 2 may be executed as respective sets of virtualized network functions. In at least some embodiments, at least a subset of the virtualized network functions of the CUs 220 and/or the 5GC 230 may be implemented using VCS compute instances, e.g., with the help of VNFMS resource orchestrators of the kind introduced above. In one embodiment, network functions of the other layers may also be implemented with the help of VNFMS resource orchestrators. In some embodiments, network functions used for virtualized Internet Protocol (IP) multimedia services (e.g., including voice over IP services), also referred to as vIMS, may be implemented using VFNMS resource orchestrators.

Figure 3:
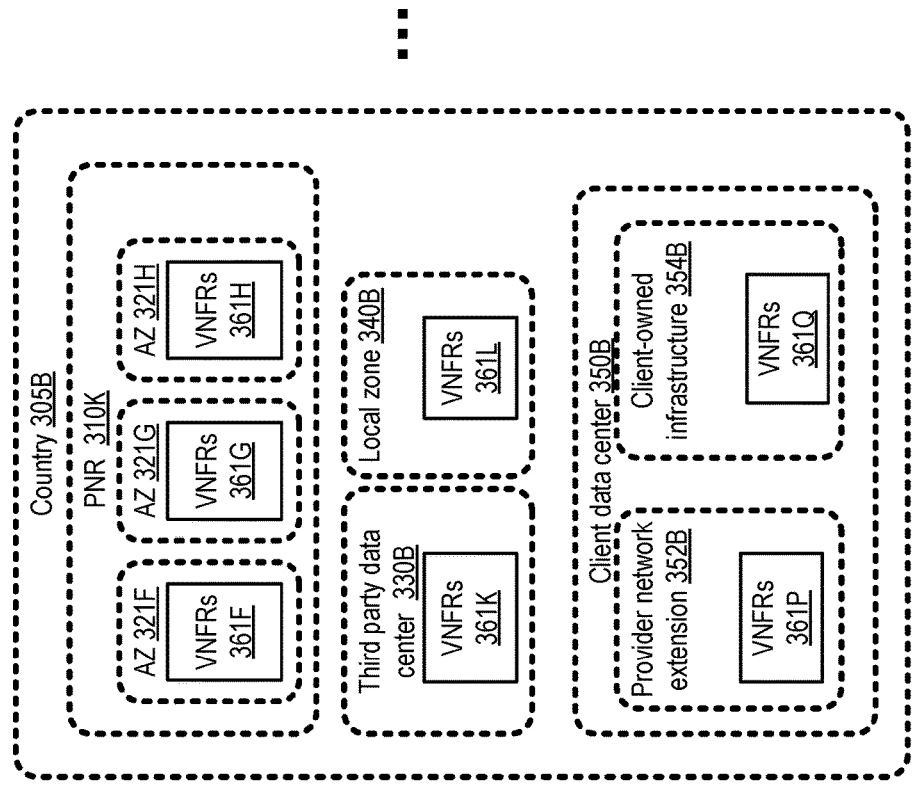
FIG. 3 illustrates examples of premises at which virtualized network function execution resources may be managed by a cloud provider service, according to at least some embodiments.
Figure 3:
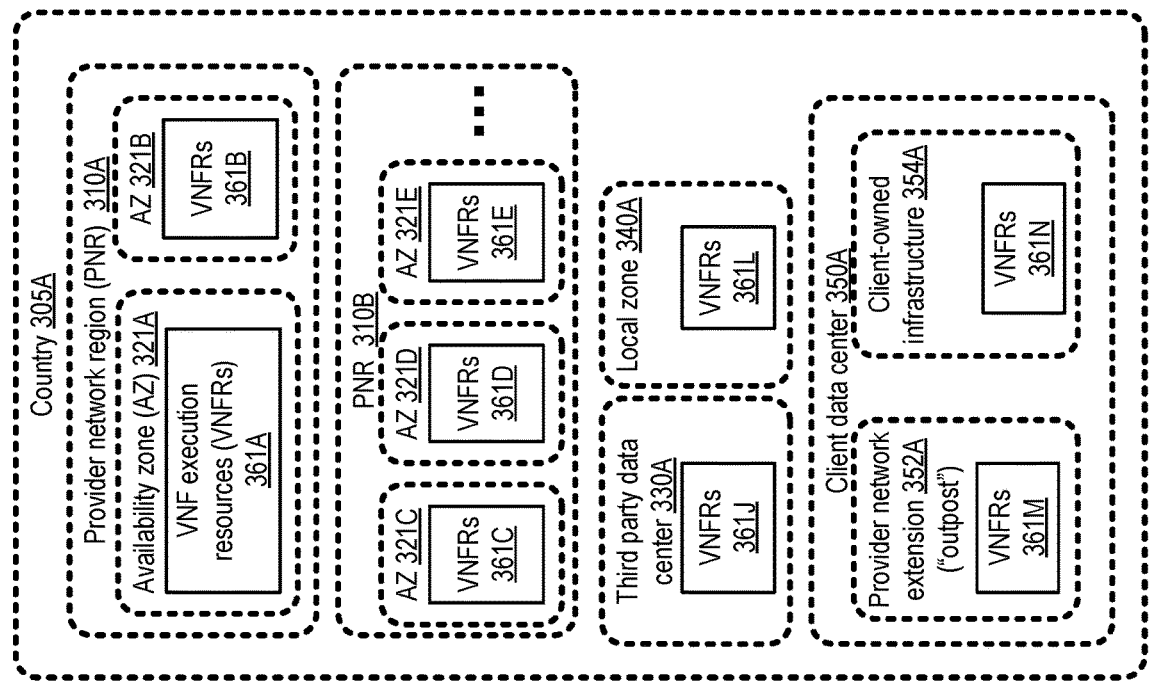

FIG. 3 illustrates examples of premises at which virtualized network function execution resources may be managed by a cloud provider service, according to at least some embodiments. Within a given country or state such as country 305A or country 305B, one or more provider network regions (PNRs) may be set up, with each PNR comprising one or more availability zones or AZs. For example, in country 305A, PNR 310A may comprise availability zones 321A and 321B, each comprising numerous virtualization hosts at which VNF execution resources (VNFRs) such as compute instances can be configured. AZ 321A may comprise VNFRs 361A, while AZ 321B may comprise VNFRs 361B. PNR 310B of country 305A may comprise AZs 321C, 321D and 321E, with VNFRs 361C, 361D and 361E respectively. Country 305B may comprise PNR 310K, with AZs 321F, 321G and 321H; these AZs may comprise VNFRs 361F, 361G and 361H respectively.

In some countries, one or more local zones and/or third-party data centers (e.g., data centers of an entity which is not the operator of the cloud provider network and is not the entity at whose request latency-sensitive applications are deployed with the help of a VNFMS) may be used to host compute instances managed by a VCS of a provider network, and such compute instances may also be used for executing VNFs. For example, VNFRs 361J may be available at third-party data center 330A in country 305A, and VNFRs 361K may be located at third-party data center 330B in country 305B. Local zone 340A in country 305A may include VNFRs 361L, while local zone 340B in country 305B may include VNFRs 361L.

Data centers of clients of a VNFMS, e.g., organizations or entities wishing to deploy latency-sensitive applications, may also be used to run VNFs managed by the VNFMS in some embodiments. At a given client data center, two types of VNFRs may be available: VNFRs are provider network extensions or outposts, and VNFRs comprising client-owned and client-managed equipment. In country 305A, client data center 350A may include provider network extensions 352A with VNFRs 361M, as well as client-owned infrastructure 354A with VNFRs 361N in the scenario depicted in FIG. 3. In country 305B, client-owned data center 350B may include VNFRs 361P of provider network extension 352B, and VNFRs 361Q at client-owned infrastructure 354B. Each of the types of premises shown in FIG. 3 may comprise pools of hosts or servers at which compute instances and/or software containers managed at least partly from the provider network (e.g., by a VNFMS or a VCS) can be run, and such compute instances and/or software containers may be used to implement VNFs. The hosts/servers may, for example, comprise agents and/or virtualization management components (such as hypervisors) of a VCS, and as such, the hosts/servers may also be managed at least partly from the provider network. In general, hundreds or thousands of premises may be available for running provider network managed VNFs, with new premises coming inline frequently, and some premises going offline from time to time. It may therefore be very difficult for a telecommunication application owner or its service orchestrators to keep track of all the options available regarding premises, and even more difficult to keep track of specific VNFRs available at those premises. Using a VNFMS as an intermediary for managing the geographically distributed deployment of latency sensitive applications, using the techniques introduced above, may consequently be very beneficial.

Figure 4:
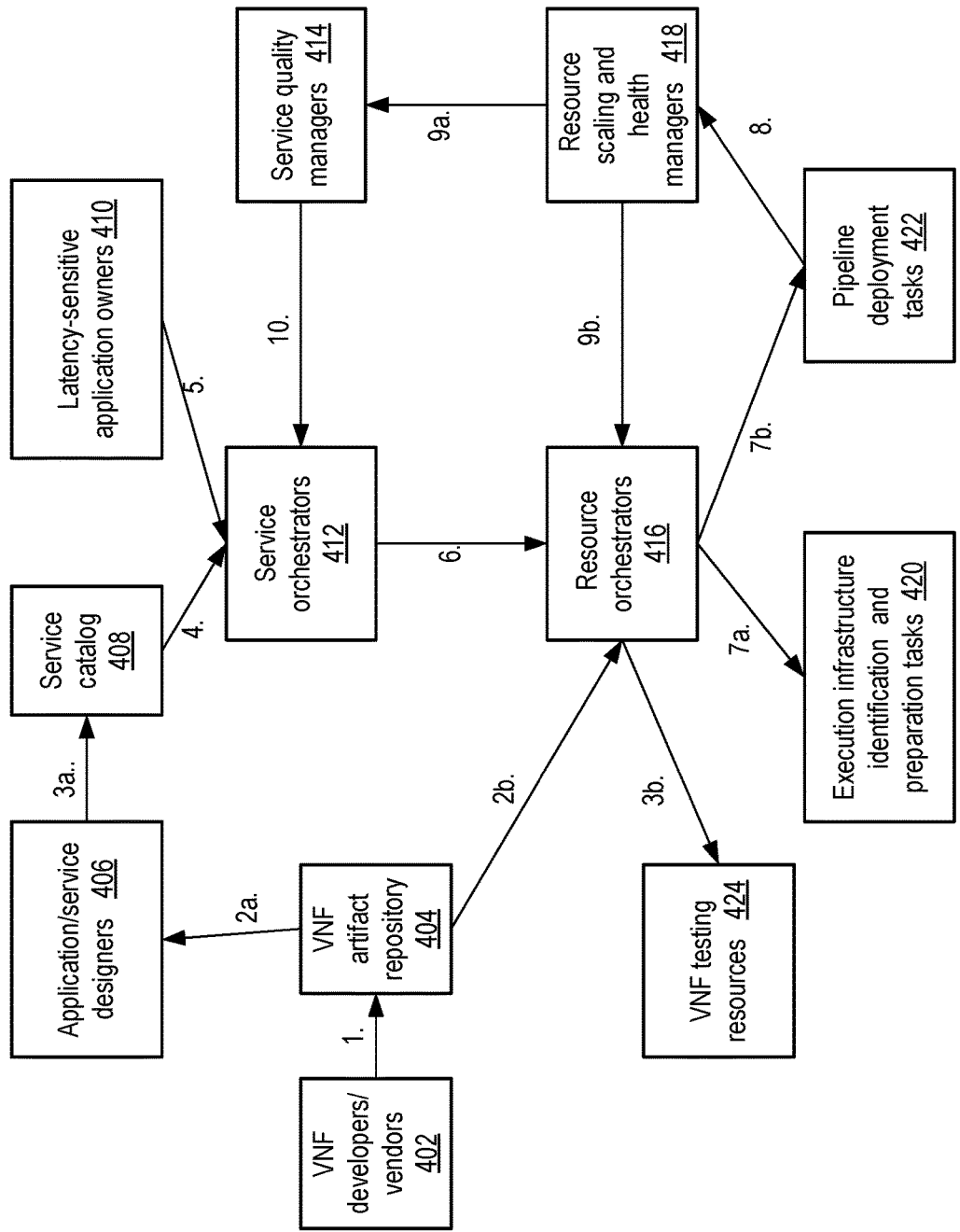
FIG. 4 illustrates an example workflow associated with deployment of virtual network function-based applications, according to at least some embodiments.

FIG. 4 illustrates an example workflow associated with deployment of virtual network function-based applications, according to at least some embodiments. VNF vendors/developers 402 may prepare the software code that implements various types of VNFs, and provide the code and/or associated artifacts (as indicated in the arrow labeled 1 in FIG. 4) via programmatic interfaces to a VNFMS similar in features and functionality to VNFMS 125 of FIG. 1. The code and/or artifacts may be stored in a VNF artifact repository 404. Application/service designers 406 may design application pipelines in which several different VNFs may be arranged in the depicted embodiment, e.g., as a directed graph of VNFs. Information about the VNF artifacts available may be accessed by the application/service designers from the repository 404, as indicated by arrow 2a in FIG. 4. In addition, resource orchestrators 416 of the VFNMS may be provided access to the VNF artifact repository, as indicated by arrow 2b.

Pipelines combining the several different VNFs for implementing various types of latency-sensitive applications may be stored in a service catalog in the depicted embodiment, as indicated by arrow 3a. In some embodiments, a single database may be used for storing artifacts representing individual VNFs and the services/applications built by combining VNFs, instead of using separate VNF artifact repository and service catalog as shown in FIG. 4. In some embodiments, the resource orchestrators 416 may have access to a set of VNF testing resources 424, e.g., as part of a continuous development and testing framework, which may be utilized to thoroughly test various versions of the VNFs as new versions become available, before new versions of the VNFs are deployed for production use. Such testing operations are indicated in FIG. 4 by arrow 3b.

Entities responsible for providing latency-sensitive applications (e.g., private or public 5G applications) to their end users may be referred to as latency-sensitive application owners. Such latency-sensitive application owners 410 may send commands or requests to service orchestrators 412 to deploy a specified service pipeline from service catalog 408, as indicated by the arrow labeled 5.

A service orchestrator 412 may obtain a descriptor of the service pipeline requested by the application owner from service catalog 408 (arrow 4) and submit a deployment request for the application to a resource orchestrator 416 of the VNFMS in the depicted embodiment. The deployment request may contain an indication of the service pipeline and its constituent VNFs, as well as performance requirements and an indication of the expected geographical distribution of the workload of the deployed service or application pipeline.

A resource orchestrator 416 may perform two kinds of tasks in response to a deployment request in the depicted embodiment. The first kind, referred to as execution infrastructure identification and preparation tasks 420 (arrow 7a), may include, for example, selecting one or more external premises at which VNFs of the requested application are to be run, based on the expected or anticipated geographical distribution of the workload of the deployed pipeline. Infrastructure identification and preparation tasks may also include identifying VNF execution resources (e.g., virtualization servers and compute instances) to be for the pipeline, setting up a container cluster based on the type of container engine which is to be used (e.g., the Docker® or Kubernetes® container engine), setting up a container namespace, setting up security roles (e.g., at an identity management service of the provider network) to be used to run the VNFs, and performing any other configuration operations needed to enable the VNFs to be run securely at the identified execution resources. In some embodiments, one or more new isolated virtual networks may be configured as part of the preparation tasks, one or more subnets may be established, and/or one or more new compute instances may be launched. Depending on the isolation requirements and/or availability/redundancy requirements of the application, which may have been specified in the deployment request, in some embodiments compute instances or other execution resources may be configured in single-tenant mode (e.g., by storing metadata indicating that programs of no more than one application or client are to be run at the resource) and/or run in redundant mode (with, for example, a primary and a secondary compute instance being configured for a given VNF). After the preparatory tasks are complete, a set of pipeline deployment tasks 422 may be performed by the resource orchestrator 416, as indicated by arrow 7b in the depicted embodiment. The deployment tasks may, for example, comprise initiating a transfer of a machine image of a container with VNF code, causing Domain Name System (DNS) entries for the VNF to be created, and issuing a command to launch the container at the selected execution resource. One or more agents for monitoring the health of the VNFs may also be launched at the selected resource in some embodiments by the orchestrator.

In the depicted embodiment, the VNFMS may include one or more resource scaling and health managers 418, which may obtain metrics of VNF and execution resource health and performance (arrow 8) from agents set up during the pipeline deployment tasks or the execution infrastructure identification and preparation tasks. The resource scaling and health managers may analyze trends in utilization levels and other metrics of the VNF execution resource and notify service quality managers (arrow 9a) regarding the status of the deployed application VNFs in some embodiments. In addition, in at least some embodiments, the resource scaling and health managers may determine that additional resources are needed for a particular VNF or a set of VNFs (e.g., based on measured performance metrics) of the application, and send a request to a resource orchestrator 416 to identify the additional resources (arrow 9b). The resource orchestrator may then identify and/or configure additional resources (e.g., additional compute instances or container clusters) and perform the needed configuration and deployment tasks to scale up the resources devoted to the application. In some embodiments, if appropriate based on the metrics being analyzed, the resource scaling and health managers may also send requests to resource orchestrators to reduce the count of resources devoted to a particular VNF or a set of VNFs. Information provided by the resource scaling and health managers 418 regarding the status of the application may be passed on to the service orchestrators (arrow 10) in some embodiments. Based on the provided information, a service orchestrator may submit a deployment modification request to a resource orchestrator (e.g., indicating a different performance requirement, or an increased budget), and the resource orchestrator may respond by re-configuring the resources being used for one or more NFVs in accordance with the modification(s) requested.

In some embodiments, at least two services related to VNF management may be implemented at a provider network: a VNF development service, and a VNF deployment service. In such an embodiment, the VNF artifact repository 404 and/or the service catalog 408 may be maintained at the VNF development service, and at least the resource orchestrators 416 and resource scaling and health managers 418 may be implemented as part of the VNF deployment service. Programs implementing the service orchestrators 412 and service quality managers 414 on behalf of latency-sensitive application owners 410 may act as clients of a VNFMS in at least some embodiments; that is, they may utilize programmatic interfaces implemented for VNFMS clients to interact with the VNFMS.

Figure 5:
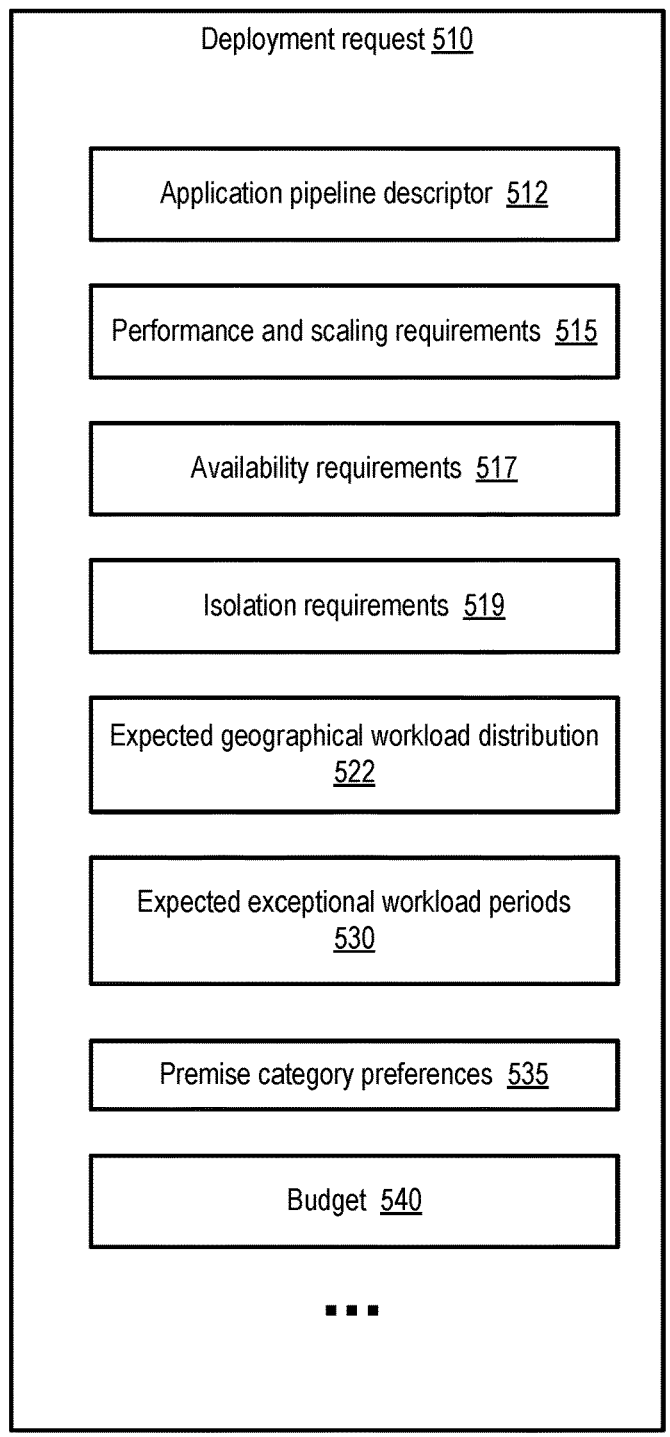
FIG. 5 illustrates example elements of a deployment request for an application implemented as a collection of virtualized network functions, according to at least some embodiments.

FIG. 5 illustrates example elements of a deployment request for an application implemented as a collection of virtualized network functions, according to at least some embodiments. A deployment request 510 may comprise application pipeline descriptor 512, performance and scaling requirements 515, availability requirements 517, isolation requirements 519, expected geographical workload distribution 522, expected exceptional workload periods 530, premise category preferences 535 and/or budget 540 in some embodiments.

The application pipeline descriptor 512 may include identifiers of the set of VNFs that are to be used for the application, and the manner in which the VNFs are to be chained or linked together. In some embodiments, a directed graph representing the connectivity desired between the VNFs may be included in the application pipeline descriptor. Such connectivity requirements may be utilized by resource orchestrators to select execution resources for VNFs (e.g., respective compute instances that are run on virtualization servers within the same rack may be preferred for VNFs that are expected to communicate extensively with one another) in some embodiments.

A variety of performance and scaling requirements 515 of the application may be indicated in the deployment request in some embodiments. These may include, among others, latency targets for individual VNFs, a target rate at which requests for a VNF are to be satisfied, network bandwidth requirements for links between end users and the deployed application and/or for links between VNFs, computation requirements such as the amount of CPU time or the number of virtual or physical CPUs needed for the application or for individual VNFs, a targeted end-user request response time range, and the like.

Availability requirements 517 may indicate the maximum acceptable downtime for the application (e.g., expressed in units of seconds or minutes per year, or in percentage terms) in some embodiments. In one embodiment, a VNFMS client may specify redundancy requirements instead of or in addition to providing availability targets—for example, a client may indicate that for at least some VNFs, multiple execution resources be set up such that if the resource being used currently fails, a standby resource can be used to process the workload of the failed resource. In other embodiments the VNFMS may set up redundant groups of based on the availability targets. Failover configurations involving more than two resources may be requested (or set up automatically by the VNFMS) in some embodiments.

Isolation requirements 519 may, for example, indicate whether various VNFs of the application should be run using execution resources (e.g., compute instances and/or virtualization hosts) that are dedicated exclusively to the VNFs, or whether it is acceptable to share a resource being used for a VNF with other programs (e.g., other VNFs of the same application or VNFs of other applications). Based on the isolation requirements, a resource orchestrator may cause metadata entries to be stored (e.g., at a VCS) indicating that one or more of the execution resources being utilized for a VNF are configured in single-tenant mode, and should not be used for any other purpose in some embodiments.

The expected geographical workload distribution 522 may indicate the locations at which, or from which, the majority of the end user requests of the application are expected. The granularity of the location information may differ based on the application; for example, in some embodiments the distribution may be specified at the neighborhood level, while in other embodiments it may be specified at the town/city level or even the state/country level. The geographical workload distribution may enable the VNFMS to select the premises at which VNFs of the application should be executed. The deployment request may also include premise category preferences 535 of the application owner, indicating for example whether the application owner prefers local zones to be used for the application, provider network extensions/outposts to be used and so on. Such preferences may be taken into account when selecting premised for the application VNFs in various embodiments. In some embodiments, in addition to providing information about average or nominal workloads expected for the application, the deployment request may also include information about expected exceptional workload periods 530 (e.g., time periods near major holidays in a country), indicating short time intervals in which the workload levels in a particular location or several locations are expected to be much higher or much lower than the average workloads. Such exception-period workload information may help the VNFMS to proactively provision sufficient resources at various affected premises to sustain the exceptional workloads in various embodiments.

In at least some embodiments, the deployment request may include an indication of a budget 540 that the application owner has targeted for the application, e.g., over some specified time period. The VNFMS may try to determine whether resources that can satisfy all the other requirements (such as performance, availability, isolation etc.) can be provided without exceeding the budget in such embodiments, and notify the deployment request submitter if the budget would be sufficient or not. In some embodiments, the VNFMS may propose recommended changes to some of the other requirements to keep the deployment under budget, or recommend that the budget be increased. In some embodiments, a deployment request may comprise elements that are not shown in FIG. 5, or some elements shown in FIG. 5 may not be included.

Figure 6:
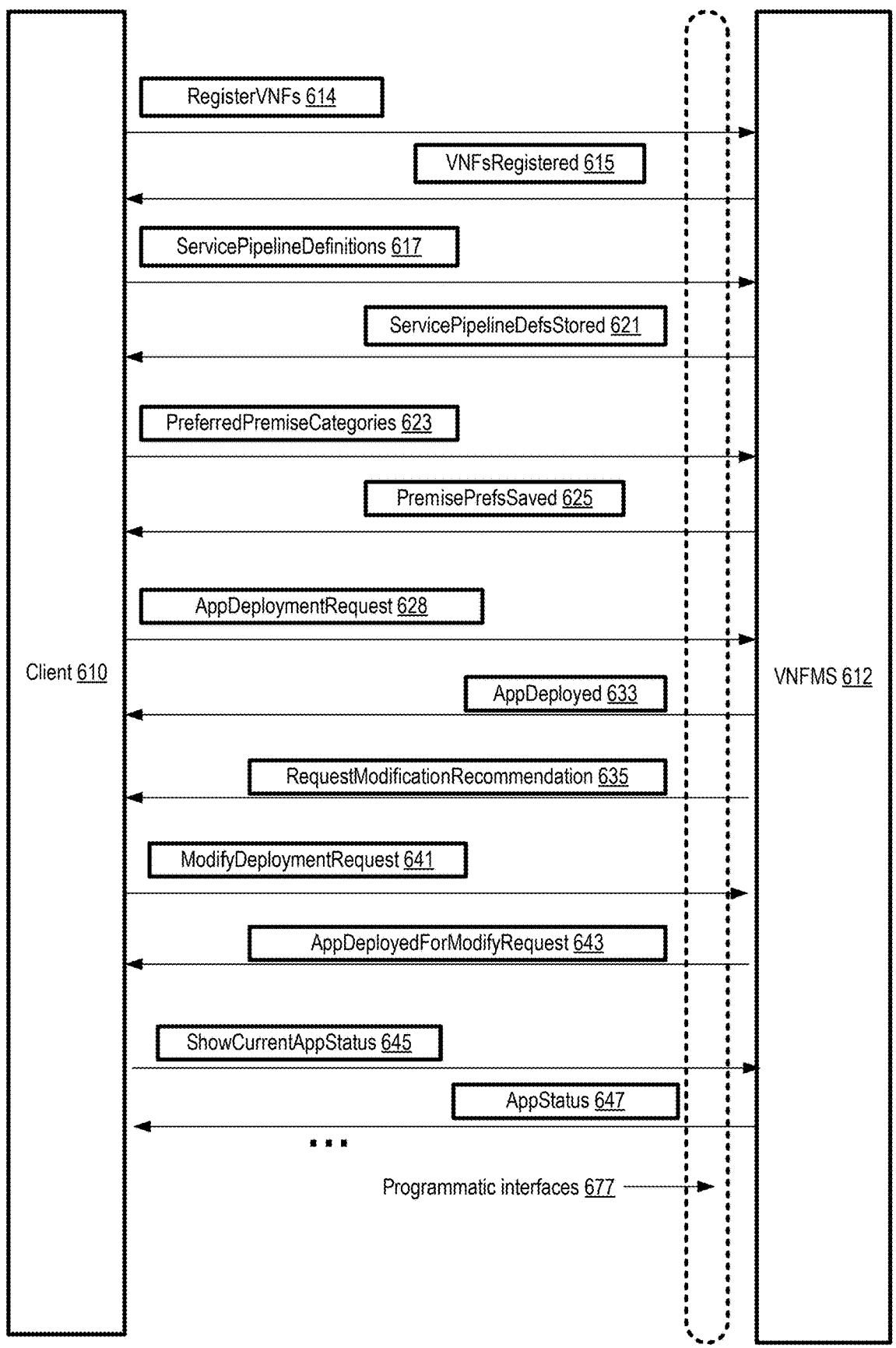
FIG. 6 illustrates example programmatic interactions related to cloud-managed orchestration of virtualized network function-based applications, according to at least some embodiments.

FIG. 6 illustrates example programmatic interactions related to cloud-managed orchestration of virtualized network function-based applications, according to at least some embodiments. A VNFMS 612, similar in features and functionality to VNFMS 125 of FIG. 1, may implement a set of programmatic interfaces 677 in the depicted embodiment. The programmatic interfaces may include, for example, one or more web-based consoles, command-line tools, APIs, and/or graphical user interfaces. The programmatic interfaces can be used by VNFMS clients 610 (such as owners/administrators of latency-sensitive applications, developers of VNFs, designers/developers of service pipelines built using VNFs, etc.) to submit requests and messages pertaining to the cloud-based management of resources to be used for executing VNF-based applications, and receive corresponding responses in various embodiments.

A VNF developer or programmer may utilize the programmatic interfaces 677 to submit new VNFs to be added to a library or repository of VNFs that can be used for various latency-sensitive applications. A RegisterVNFs request 614 may be used to provide information about one or more VNFs and/or the software code implementing the VNFs in the depicted embodiment. The information about the VNFs may be stored, and a VNFsRegistered response message 615 may be sent to the client 610.

Designers of pipeline that combine or chain several different VNFs to implement an application or service may submit a ServicePipelineDefinitions message 617 via the programmatic interfaces 677 in some embodiments, comprising a respective descriptor of one or more pipelines. The descriptor may indicate the manner in which different registered VNFs are linked, e.g., in a directed graph, to perform the tasks of the application or service. The information about the pipelines may be stored, and a ServicePipelineDefs-Stored message 621 may be sent to the pipeline designer in some embodiments.

An owner of a latency-sensitive application which utilizes one or more such pipelines may submit a PreferredPremise-Categories message 623 to the VNFMS 612 in some embodiments, indicating preferences for the types of premises which should be selected for the VNF execution resources of the application. Some application owners may, for example, prefer that their (i.e., the application owners') premises be used as far as possible; others may wish to utilize local zones or third-party data centers as much as possible, for example. Note that it may not always be possible for the VNFMS to satisfy the premise preferences completely (i.e., not all the VNF execution resources may eventually be located at premises of the preferred types), but the VNFMS may take the preferences into account when selecting premises and attempt to find as many premises that match the preferences as possible. For example, for an application that is to be implemented in several different states or countries, the VNFMS may be able to find premises in one country that match the preferences, but may have to choose other types of preferences in other countries or states. The preferences may be stored at a client requirements/preferences database of the VNFMS in some embodiments, and a PremisePrefsSaved message 625 may be sent to the client.

An AppDeploymentRequest 628 may be submitted to the VNFMS to request the deployment of a latency-sensitive application built using VNF pipelines in the depicted embodiment. The deployment request may include some or all of the kinds of elements shown in FIG. 5, including for example an expected geographical distribution of workload of the application and performance requirements. In some embodiments, a resource orchestrator of the VNFSM may analyze the requirements indicated in the deployment request. If the resource orchestrator determines that the requirements can be met, the resource orchestrator may respond to the deployment request by identifying, based on then geographical distribution of the workload, at least one premise external to the data centers of the provider network at which the VNFSM is implemented. Within such an external premise, specific execution resources (such as VCS compute instances) may be configured and/or identified from a pre-existing set of execution resources for one or more VNFs, and the VNFs may be launched at the resources. An AppDeployed response message 633 may be sent to the client after the application's VNFs are launched in various embodiments. In some embodiments, before deploying the application, the VNFMS may send a proposed deployment plan to the client via the programmatic interfaces 677, indicating the locations of one or more premises at which the VNFs of the application are to be run, and the client 610 may be requested to provide programmatic approval of the plan before the plan is enacted.

In some cases, the resource orchestrator may be able to detect that at least a subset of the requirements or constraints (e.g., budget constraints) indicated in a deployment request cannot be satisfied simultaneously with all the other requirements. For example, a client 610 may request a latency of at most T1 milliseconds for a VNF or for an end-user request, and the resources accessible to the VNFMS may only be able to support latencies of 2*T1 milliseconds. Alternatively, the client may have specified a budget, and the resource orchestrator may discover that the targeted performance may not be achievable for the specified budget, although the targeted performance may be achievable for a higher budget. In such scenarios in which the set of requirements of the original deployment request is found to be unsupportable, the resource orchestrator may generate and transmit one or more suggestions to the client in some embodiments. The suggestions, contained in a RequestModificationRecommendation message 635, may recommend changes to values of one or more parameters of the deployment request in the depicted embodiment—e.g., a lowering of a performance goal (such as an increase in permissible latency) may be recommended, and/or a change in a budget may be recommended. The client may submit a changed deployment request with some parameters modified based on the recommendation in some embodiments, e.g., in a ModifyDeploymentRequest 641. If a VNFMS resource orchestrator determines that the modified deployment request's requirements can be satisfied, one or more premises may be selected, resources at those premises may be identified for running VNFs of the application, the VNFs may be launched, and an AppDeployedForModifyRequest message 643 may be sent to the client.

In some embodiments, a client may change the deployment parameters after an application is deployed, e.g., in view of temporary or permanent anticipated increases in workload and/or if new types of VNFs are to be added to a pipeline. In such a scenario, a ModifyDeploymentRequest 641 may be sent by the client even if no recommendation to modify an earlier deployment request was generated by the VNFMS 612. The VNFMS may respond to such a ModifyDeploymentRequest in a similar manner as described above, and send an AppDeployedForModifyRequest if the modified requirements have been satisfied and the app has been deployed after an appropriate set of premises and resources have been found.

In at least some embodiments, metrics of various kinds may be collected with respect to various VNFs deployed using resource orchestrators of the VNFMS, such as the rates at which requests for the different VNFs have been processed over some time period, latencies of individual VNFs or pipelines, and so on. A client 610 may submit a ShowCurrentAppStatus request 645 to view the metrics, and an AppStatus message 647 comprising metrics and/or metric trends over time may be sent to the client from the VNFMS in the depicted embodiment. It is noted that programmatic interactions pertaining to the deployment of applications with the help of cloud-based resource orchestrators, other than those interactions shown in FIG. 6, may be supported by a VNFMS in at least some embodiments.

Figure 7:
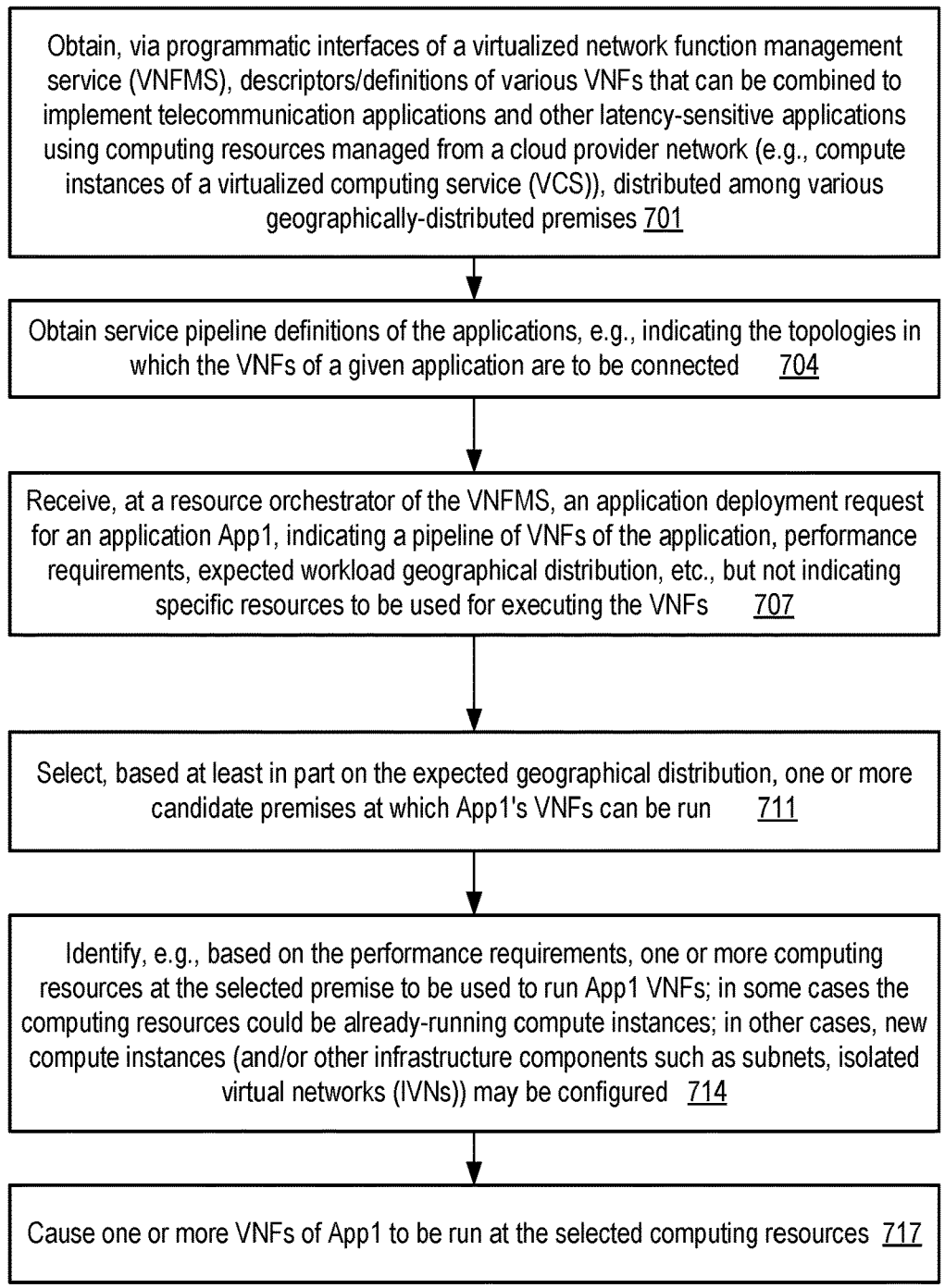
FIG. 7 is a flow diagram illustrating aspects of operations which may be performed to deploy virtualized network-function based applications, according to at least some embodiments.

FIG. 7 is a flow diagram illustrating aspects of operations which may be performed to deploy virtualized network-function based applications, according to at least some embodiments. As shown in element 701, description/definitions of various virtualized network functions that can be combined to implement telecommunication applications and other geographically distributed latency-sensitive applications at resources managed from a cloud provider network may be obtained at a VNFMS similar in features and functionality to VNFMS 125 of FIG. 1. The resources which may be usable for the application and managed at least in part from the cloud provider network may for example include virtualization servers, compute instances or virtual machines run on the virtualization servers, and/or un-virtualized servers in different embodiments; the resources may be distributed among a number of premises of the types illustrated in FIG. 3. In some cases, the VNFMS may implement programmatic interfaces that may be used by VNF designers/developers to register VNFs with the VNFMS. In other embodiments, the VNF descriptors may be stored at a separate service of the cloud provider network at which the VNFMS is implemented, and the VNFMS may be provided access to the descriptors. A VNF descriptor may, for example, include source code of a VNF, executable code of the VNF, configuration files associated with executing the VNF, an identifier of a software container comprising the executable version of the VNF, and/or a machine image of such a software container in different embodiments.

Service pipeline definitions of the applications, e.g., indicating the interconnections and directions of data flows between multiple VNFs making up a constituent service of the application, or making up the application as a whole, may be obtained at the VNFMS in various embodiments (element 704). In some embodiments, such pipelines may be constructed by service designers that are provided access to a repository of VNF descriptors maintained by the VNFMS or some other service of the provider network. In at least one embodiment, descriptors of individual VNFs as well as definitions of pipelines combining the VNFs may be stored at the same repository of a VNFMS. In other embodiments, VNF descriptors may be stored separately from pipeline descriptors.

An application deployment request for a latency-sensitive application App1 may be received via programmatic interfaces of the VNFMS at a resource orchestrator or other subcomponent of the VNFMS in various embodiments (element 707). The deployment request may indicate the pipeline or pipelines of VNFs that are to be implemented for the application, performance requirements of the application, and an expected geographical distribution of the workload of the application. In some embodiments, the request may also include availability requirements, isolation requirements, budget constraints, and/or other properties or requirements of the application. Deployment requests for a variety of latency-sensitive applications, such as private or public 5G applications, other telecommunication applications, virtual-reality applications, augmented-reality applications, gaming applications and the like may be directed to the VNFMS in different embodiments.

Based at least in part on the geographical distribution information included in the deployment request, one or more candidate premises at which VNFs of the pipeline can be run may be selected by the resource orchestrator in the depicted embodiment (element 711). For example, if low-millisecond latencies are indicated in the performance requirements for VNF request responses, and a large subset of the workload is expected to originate from end-user devices such as cell phones in a city C1, one or more premises close to (or within) C1 may be selected by the resource orchestrator. Multiple premises may be selected in some embodiments based on the extent to which the workload of the application is expected to be spread out over various cities, states, or countries. In some embodiments, one or more data centers of the provider network may be close enough to an area from which a substantial portion of the workload of the application is expected that the data centers may be included among the premises to be used.

Based at least in part on performance requirements of the application, one or more candidate computing resources may be identified by the resource orchestrator to run a VNF of the application App1 at a selected premise (element 714). In some cases, the resources could include already running compute instances. In other cases, the resource orchestrator may have to perform some configuration operations to enable the VNF to be run—e.g., new compute instances may be launched, new isolated virtual networks may be configured, new subnets may be configured within the isolated virtual networks, and so on. For some of the configuration operations, the resource orchestrator may submit programmatic requests to the control plane of a VCS in one embodiment.

After a suitable execution resource for the VNF has been identified at the selected premise, the resource orchestrator may cause the VNF to be run at the execution resource in the depicted embodiment (element 717). Similarly, for each of the VNFs that make up the pipeline, suitable premises and suitable resources within the premises may be identified by the resource orchestrator, and the VNFs may be run at the identified resources.

It is noted that in various embodiments, some of the operations shown in the flow diagram of FIG. 7 may be implemented in a different order than that shown in the figure, or may be performed in parallel rather than sequentially. Additionally, some of the operations shown in FIG. 7 may not be required in one or more implementations.

Figure 8:
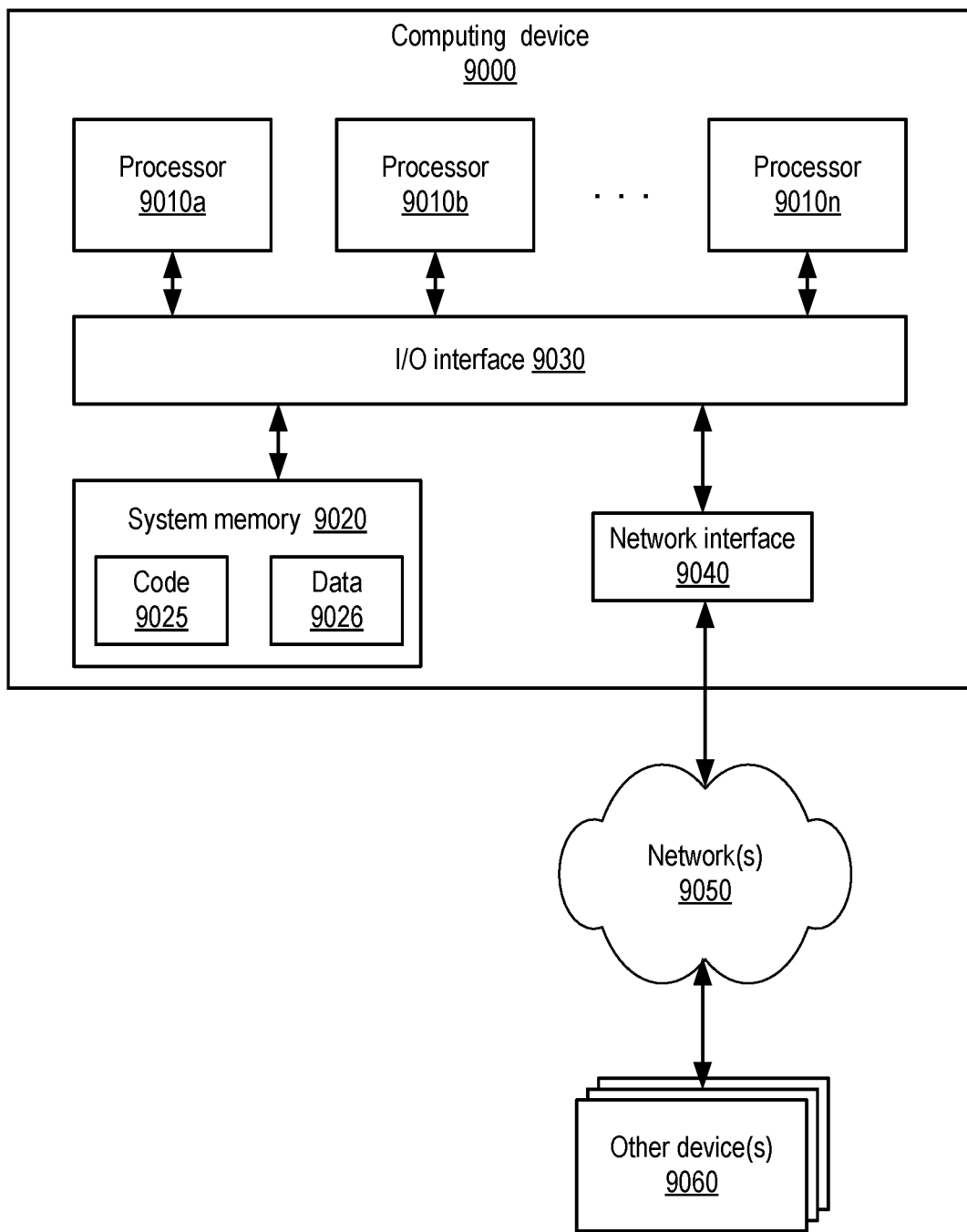
FIG. 8 is a block diagram illustrating an example computing device that may be used in at least some embodiments.

In at least some embodiments, a server that implements the types of techniques described herein (e.g., including functions of a VNFMS, a VCS and/or other services of a cloud provider network) may include a general-purpose computer system that includes or is configured to access one or more computer-accessible media. FIG. 8 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 7, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 7. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a resource orchestrator of a network function management service of a cloud provider network; and
a set of candidate resources for execution of software containers, wherein subsets of the set are located at a plurality of premises at respective geographical locations, wherein the plurality of premises includes at least one premise other than a data center of the cloud provider network;
wherein the resource orchestrator is configured to:
obtain, via one or more programmatic interfaces from a service orchestrator associated with a telecommunication application, a deployment request for the telecommunication application, wherein the deployment request indicates (a) a pipeline of virtualized network functions of the telecommunication application, (b) a performance requirement of the telecommunication application, and (c) a geographical distribution indicating one or more locations where a workload of the telecommunication application is expected, and wherein the deployment request does not identify a resource to be used for the telecommunication application;
select, based at least in part on the geographical distribution, a premise of the plurality of premises;
identify, based at least in part on the performance requirement, a particular candidate resource for executing a virtualized network function of the pipeline at the selected premise; and
cause the virtualized network function of the pipeline to be executed using a software container at a particular candidate resource.

2. The system as recited in claim 1, wherein the virtualized network function comprises a portion of one or more of: (a) a centralized unit (CU) of a radio-based communication technology stack, (b) a distributed unit (DU) of the radio-based communication technology stack, (c) a fifth-generation core (5GC) layer of the radio-based communication technology stack or (d) a virtualized Internet Protocol (IP) multimedia service (vIMS).

3. The system as recited in claim 1, wherein the performance requirement comprises one or more of: (a) a virtualized network function latency, (b) a request rate for a virtualized network function, (c) a network bandwidth requirement, (d) a computation requirement, or (e) a targeted end-user request response time range.

4. The system as recited in claim 1, wherein the selected premise is one of: (a) a local zone of the cloud provider network, (b) a premise of a client of the cloud provider network or (c) a third-party data center.

5. The system as recited in claim 1, wherein the particular candidate resource comprises a compute instance of a virtualized computing service of the cloud provider network.

6. A computer-implemented method, comprising:
obtaining, via one or more programmatic interfaces at a network function management service of a cloud computing environment, a request to deploy a latency-sensitive application, wherein the request does not identify resources to be used for the latency-sensitive application;

selecting, at the network function management service, based at least in part on a geographical distribution indicating one or more locations where a workload of the latency-sensitive application is expected, a premise of a plurality of premises among which computing resources managed at least partly from the cloud computing environment are distributed; and causing, by the network function management service, a first virtualized network function of the latency-sensitive application to be executed at a particular resource located at the selected premise.

7. The computer-implemented method as recited in claim 6, wherein the request indicates a performance requirement of the latency-sensitive application, the computer-implemented method further comprising:

selecting the particular resource by the network function management service for the first virtualized network function based at least in part on the performance requirement.

8. The computer-implemented method as recited in claim 7, wherein the performance requirement comprises one or more of: (a) a virtualized network function latency, (b) a request rate for a virtualized network function, (c) a network bandwidth requirement, (d) a computation requirement, or (e) a targeted end-user request response time range.

9. The computer-implemented method as recited in claim 6, wherein the request indicates a connectivity requirement among a plurality of virtualized network functions of the latency-sensitive application, including the first virtualized network function and a second virtualized network function, the computer-implemented method further comprising:

selecting the particular resource by the network function management service for the latency-sensitive application, based at least in part on the connectivity requirement.

10. The computer-implemented method as recited in claim 6, further comprising:

in response to (a) receiving another request for deploying another latency-sensitive application, and (b) determining that a particular requirement indicated in the other request cannot be satisfied, transmitting, by the network function management service, a recommendation to modify the other request.

11. The computer-implemented method as recited in claim 10, wherein the recommendation indicates one or more requirements of the other request as candidates for modification, including one or more of (a) a performance requirement, or (b) a budget requirement.

12. The computer-implemented method as recited in claim 6, wherein the first virtualized network function implements a functionality of one or more of: (a) a centralized unit (CU) of a radio-based communication technology stack, (b) a distributed unit (DU) of the radio-based communication technology stack, (c) a fifth-generation core (5GC) layer of the radio-based communication technology stack or (d) a virtualized IP multimedia service (vIMS).

13. The computer-implemented method as recited in claim 6, wherein the latency-sensitive application comprises one or more of: (a) a radio-based application, (b) a virtual reality application, (c) an augmented reality application, (d) a multi-player game, or (e) a time-sensitive analytics application.

14. The computer-implemented method as recited in claim 6, wherein the selected premise is one of: (a) a local zone of the cloud computing environment, (b) a data center in a region of the cloud computing environment, (c) a premise of a client of the cloud computing environment or (d) a premise of a telecommunication vendor.

15. The computer-implemented method as recited in claim 6, further comprising:

configuring an isolated virtual network of a virtualized computing service of the cloud computing environment, wherein the first virtualized network function is launched within the isolated virtual network.

16. A non-transitory computer-accessible storage medium storing program instructions that when executed on a processor:

obtain, via one or more programmatic interfaces at a network function management service of a cloud computing environment, a request to deploy an application comprising one or more virtualized network functions, wherein the request does not identify resources to be used for the application;

select, at the network function management service, based at least in part on a geographical distribution indicating one or more locations where a workload of the application is expected, a premise of a plurality of premises among which computing resources managed at least partly from the cloud computing environment are distributed; and cause, by the network function management service, a first virtualized network function of the application to be executed at a particular resource located at the selected premise.

17. The non-transitory computer-accessible storage medium as recited in claim 16, wherein the request indicates a performance requirement of the application, the non-transitory computer-accessible storage medium storing further program instructions that when executed on the processor:

select the particular resource by the network function management service for the first virtualized network function based at least in part on the performance requirement.

18. The non-transitory computer-accessible storage medium as recited in claim 16, wherein the request indicates a connectivity requirement among a plurality of virtualized network functions of the application, including the first virtualized network function and a second virtualized network function, the non-transitory computer-accessible storage medium storing further program instructions that when executed on the processor:

select the particular resource by the network function management service for the application based at least in part on the connectivity requirement.

19. The non-transitory computer-accessible storage medium as recited in claim 16, wherein the first virtualized network function implements a functionality of one or more of: (a) a centralized unit (CU) of a radio-based communication technology stack, (b) a distributed unit (DU) of the radio-based communication technology stack, (c) a fifth-generation core (5GC) layer of the radio-based communication technology stack or (d) a virtualized IP multimedia service (vIMS).

20. The non-transitory computer-accessible storage medium as recited in claim 16, wherein the application comprises one or more of: (a) a radio-based application, (b) a virtual reality application, (c) an augmented reality application, (d) a multi-player game, or (e) a time-sensitive analytics application.

* * * * *